United States Patent
Burgoyne, Jr. et al.

(10) Patent No.: US 9,006,353 B2
(45) Date of Patent: *Apr. 14, 2015

(54) CROSSLINKING COMPOUNDS FOR HIGH GLASS TRANSITION TEMPERATURE POLYMERS

(75) Inventors: William Franklin Burgoyne, Jr., Bethlehem, PA (US); Andrew Francis Nordquist, Whitehall, PA (US); Kerry A. Drake, Red Hill, PA (US); Le Song, North Wales, PA (US)

(73) Assignee: Delsper LP, Kulpsville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/357,613

(22) PCT Filed: Nov. 18, 2011

(86) PCT No.: PCT/US2011/061413
§ 371 (c)(1),
(2), (4) Date: May 12, 2014

(87) PCT Pub. No.: WO2013/074120
PCT Pub. Date: May 23, 2013

(65) Prior Publication Data
US 2014/0323668 A1 Oct. 30, 2014

(51) Int. Cl.
*C08G 65/48* (2006.01)
*C08G 16/00* (2006.01)
(Continued)

(52) U.S. Cl.
CPC ............ *C08G 16/00* (2013.01); *C08K 5/0025* (2013.01); *C08G 65/48* (2013.01); *C08G 65/485* (2013.01);
(Continued)

(58) Field of Classification Search
None
See application file for complete search history.

(56) References Cited

U.S. PATENT DOCUMENTS 3,533,997 A * 10/1970 Angelo ......................... 525/436
3,966,729 A 6/1976 Kovar et al.
(Continued)

FOREIGN PATENT DOCUMENTS

EP 0443352 A2 1/1991
EP 0939096 A2 9/1999
(Continued)

OTHER PUBLICATIONS

Weber et al. "Inclusion Compounds of Diol Hosts Featuring Two 9-Hydroxy-9-fluorenyl or Analogous Groups Attached to Linear Spacer Units" Eur. J. Org. Chem. 2002, 856-872.*
(Continued)

*Primary Examiner* — Robert S Loewe
(74) *Attorney, Agent, or Firm* — McNees Wallace & Nurick LLC

(57) ABSTRACT

A composition having a crosslinking compound that has the following structure (I) wherein R is OH, $NH_2$, halide, ester, amine, ether, or amide, and x is 2-6 and A is an arene moiety having a molecular weight of less than about 10,000. A mixture including the composition and a polymer, a method for forming the mixture and a crosslinked polymer are also disclosed.

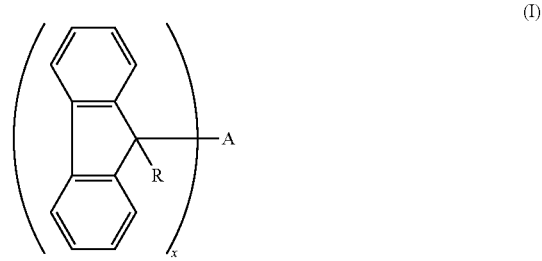

(I)

31 Claims, 4 Drawing Sheets (51) Int. Cl.
*C08K 5/00* (2006.01)
*C08L 71/00* (2006.01)
*C08L 81/06* (2006.01)

(52) U.S. Cl.
CPC ............ *C08L 71/00* (2013.01); *C08G 2650/20* (2013.01); *C08G 2650/40* (2013.01); *C08L 81/06* (2013.01)

(56) References Cited

U.S. PATENT DOCUMENTS

| | | | |
|---|---|---|---|
| 4,731,442 A | 3/1988 | Lindley et al. | |
| 5,114,780 A | 5/1992 | Mercer et al. | |
| 5,138,028 A | 8/1992 | Paul et al. | |
| 5,155,175 A * | 10/1992 | Mercer et al. | 525/390 |
| 5,179,188 A | 1/1993 | Mercer et al. | |
| 5,658,994 A | 8/1997 | Burgoyne, Jr. | |
| 5,874,516 A | 2/1999 | Burgoyne, Jr. | |
| 6,060,170 A | 5/2000 | Burgoyne, Jr. | |
| 6,346,296 B1 | 2/2002 | McCarthy et al. | |
| 6,818,663 B2 | 11/2004 | Chu et al. | |
| 6,897,267 B2 | 5/2005 | Narang et al. | |
| 7,517,641 B2 | 4/2009 | Narang et al. | |
| 8,236,787 B2 | 8/2012 | Piccariello et al. | |
| 2002/0099158 A1 | 7/2002 | Godschalx et al. | |
| 2004/0013887 A1 | 1/2004 | Hichri et al. | |
| 2004/0158024 A1 | 8/2004 | Lau et al. | |
| 2007/0275627 A1 | 11/2007 | Jung et al. | |
| 2007/0296101 A1 | 12/2007 | DiPietro et al. | |
| 2008/0006797 A1 | 1/2008 | Kawai et al. | |
| 2008/0078267 A1 | 4/2008 | Keller et al. | |
| 2009/0004488 A1 | 1/2009 | Park et al. | |
| 2010/0022718 A1* | 1/2010 | Tu et al. | 525/471 |
| 2012/0130041 A1* | 5/2012 | Han et al. | 528/125 |
| 2013/0130529 A1* | 5/2013 | Ayers | 439/271 |

FOREIGN PATENT DOCUMENTS

| | | |
|---|---|---|
| EP | 2313465 | 2/2010 |
| JP | 11315139 | 11/1999 |
| JP | 2000344898 | 12/2000 |
| JP | 2002523549 | 7/2002 |
| JP | 2004504424 | 2/2004 |
| JP | 2007317666 | 12/2007 |
| JP | 2009202824 | 9/2009 |
| JP | 2011512430 | 4/2011 |
| WO | 91/16370 A1 | 10/1991 |
| WO | 9701594 | 1/1997 |
| WO | 97/10193 A1 | 3/1997 |
| WO | 0011096 A1 | 3/2000 |
| WO | 0206366 | 1/2002 |
| WO | 2007139271 A1 | 12/2007 |
| WO | 2008073440 A2 | 6/2008 |
| WO | 2010019488 A1 | 2/2010 |

OTHER PUBLICATIONS

Dahl et al. "Antiaromaticity in Distal Bisfluorenyl Dications Separated by Multiple Discrete Spacer Units" Organic Letters, 2008, vol. 10(24), 5605-5608.*
E. Weber, et al., "Inclusion Compounds of Diol Hosts Featuring Two 9-Hydroxy-9-Fluorenyl or Analogous Groups Attached to Linear Space Units", European Journal of Organic Chemistry, 2002, pp. 856-872.
Korean Office Action for Korean Patent Application No. 10-2011-7005723 dated Sep. 26, 2012 (including English language translation).
JP Office Action, Patent Application No. 2011-523062, Mailing Date: Nov. 20, 2012, 3708 4J00, Ref. No. B115205.
International Search Report and Written Opinion received in PCT/US2009/053250.
A. Banihashemi. Aromatic Polyether, -Ketone, -Sulfones as Laminating Resins. XI. Polymers Derived from 2,2'-Diiododiphenyl-4,4'-Dicarboxylic Acid, Journal of Polymer Science: Polymer Chemistry Edition, vol. 15, pp. 2653-2665 (1977).
F. Hedberg. Phenylethynyl-Pendant Polyphenylquinoxalines Curable by an Intramolecular Cycloaddition Reaction, Journal of Polymer Science: Polymer Chemistry Edition, vol. 14, pp. 2607-2619 (1976).
P.M. Hergenrother. Poly(phenylquinoxalines) Containing Phenylethynyl Groups, Macromolecules 1981, 14, pp. 898-904.
Q. Zhou. New Approaches to All Carbon Ladder Polymers: Cyclization Reactions of Acetylenes, Polym. Preprint (1993), 34(1), pp. 193-194.
P.M. Hergenrother. Poly(phenylquinoxalines) Containing Ethynyl Groups, Macromolecules, vol. 14, No. 4, Jul.-Aug. 1981, pp. 891-897.
C. Burke. High Pressure/High Temperature Technology and Introduction of LHT a New High Temperature Plastic, Merl, Oilfield Engineering with Polymers 2010, Sep. 21, 2010, Greene Tweed & Co.

* cited by examiner

FIG. 4

CROSSLINKING COMPOUNDS FOR HIGH GLASS TRANSITION TEMPERATURE POLYMERS

BACKGROUND OF THE INVENTION

The present invention is directed to crosslinking compositions and mixtures for forming crosslinked high glass transition polymer systems.

High glass transition temperature polymers have been useful for a number of high temperature applications. Crosslinking generally improves high temperature performance, strength and chemical resistance compared to the base polymer. However, crosslinking of high glass temperature polymers to form polymers having the desired high temperature properties is generally not known in the art. For example, in previous attempts to crosslink high glass transition temperature (Tg) polymers the thermal stability of the polymer is compromised. This is particularly true for those high Tg polymers wherein the desired temperature for reaction (cure) may range from 200-450° C.

Crosslinking has been recognized as one way to address the requirements of high performance polymeric materials. Past attempts have used various different approaches for crosslinking polymers. One such attempt is described, for example, in U.S. Pat. No. 6,060,170, which is assigned to one of the assignees of the present application and is incorporated by reference in its entirety. The U.S. Pat. No. 6,060,170 describes the use of poly(arylene ether) polymer compositions having aromatic groups grafted on the poly(arylene ether) backbone, whereby the grafts allow for crosslinking of the polymers in a temperature range of from 200 to 450° C. One of the limitations of the U.S. Pat. No. 6,060,170 includes the requirement of the polymer to be dissolved in an appropriate solvent for grafting the crosslinking group. Such required process steps make grafting difficult or impossible for certain polymers, such as polyether ether ketone (PEEK).

U.S. Pat. No. 5,658,994, which is also assigned to one of the assignees of the present application and is incorporated by reference in its entirety, describes the use of poly(arylene ethers) as low dielectric interlayers for the electronics industry wherein the poly(arylene ether) may be crosslinked, for example, by crosslinking itself, through exposure to temperatures of greater than approximately 350° C., or alternatively by providing a crosslinking agent. In addition, the U.S. Pat. No. 5,658,994 also teaches end capping the polymer with known end cap agents, such as phenylethynyl, benzocyclobutene, ethynyl, and nitrile. The U.S. Pat. No. 5,658,994 shows a limit in the degree of crosslinking due to the crosslinking agent only being present at the end of the polymer chain. Crosslinking occurs only at the ends, therefore there are no crosslinks between mid-portions of the polymer chains. The limited degree of crosslinking results in a lower than desired glass transition temperature, reduced chemical resistance, as well as mechanical properties that are below desired levels.

International Patent Application Publication WO/2010/019488, which is incorporated by reference in its entirety, discloses the use of per(phenylethynyl)arenes as additives for crosslinking poly(arylene ether)s, polyimides, polyureas, polyurethanes, or polysulfones. The patent application does not disclose crosslinking, but utilizes a semiinterpenetrating polymer network between two polymers to provide improved properties.

The references Hedberg, F. L.; Arnold, F. E; *J. Polym. Sci., Polym. Chem. Ed.* 10 (1976) 14, 2607-19 and Banihashemi, A; Marvel, C. S.; *J. Polym. Sci., Polym. Chem. Ed.* (1977) 15, 2653-65, each of which is incorporated by reference in their entirety, disclose the preparation of polyphenylquinoxalines with pendant phenylethynyl groups and their thermal cure via intramolecular cycloaddition and the heating of the 2,2'-di (phenylethynyl)biphenyl moiety to produce a 9-phenyldibenz[a,c]anthracene moiety which enhances the Tg of the polymer. The Hedberg and Banihashemi are similar to the to the U.S. Pat. No. 5,658,994 discussed above, which is limited in the degree of crosslinking due to the crosslinking agent only being present at the end of the polymer chain. Crosslinking occurs only at the ends, therefore there are no crosslinks between mid-portions of the polymer chains. The limited degree of crosslinking results in a lower than desired glass transition temperature, reduced chemical resistance, as well as mechanical properties that are below desired levels.

The references Hergenrother, P. M.; *Macromolecules* (1981) 14, (4) 891-897; and Hergenrother, P. M.; *Macromolecules* (1981) 14, (4) 898-904, each of which is incorporated by reference in their entirety, disclose the preparation of poly (phenylquinoxalines) containing pendent phenylethynyl groups along the backbone, where these materials were prepared for evaluation as precursors for high thermally stable thermosets. The preparation of the poly(phenylquinoxalines) containing pendent phenylethynyl groups requires the synthesis of the poly(phenylquinoxalines) with monomers containing the phenylethynyl groups. The synthesis disclosed in the Hergenrother article is complicated and provides expensive processing and materials.

U.S. Pat. No. 5,138,028 and EP Patent Application No. 443352 A2 910828, each of which is incorporated by reference in their entirety, describes the preparation of polyimides, polyamic acids, polyamic acid esters, and polyisoimides which are end-capped with diarylacetylenes. The cured products can be used for encapsulation of electronic devices, as adhesives, and as moldings. The U.S. Pat. No. 5,138,028 and the EP Patent Application No. 443352 A2 910828 are similar to the to the U.S. Pat. No. 5,658,994 discussed above, which is limited in the degree of crosslinking due to the crosslinking agent only being present at the end of the polymer chain. Crosslinking occurs only at the ends, therefore there are no crosslinks between mid-portions of the polymer chains. The limited degree of crosslinking results in a lower than desired glass transition temperature, reduced chemical resistance, as well as mechanical properties that are below desired levels.

International Patent Application Publication WO 97/10193, which is incorporated by reference in its entirety, discloses various multi-phenylethynyl compounds which can be used for coating a wide variety of substrates such as computer chips. The reference Zhou, Q et al., *Polym. Preprint* (1993) 34(1), 193-4, which is incorporated by reference in its entirety, describes the preparation of carbon ladder polymers via the cyclization reactions of acetylenes. The WO 97/10193 publication discloses insitu formation of the polymer, wherein the carbon ladder polymers are insoluble. The synthesis disclosed in the WO 97/10193 publication is complicated and provides expensive processing and materials. In addition, the insolubility of the carbon ladder polymers provides substantial limits to the processing capabilities of the method.

U.S. Pat. No. 5,179,188, which is incorporated by reference in its entirety, describes polymers (oligomers) such as those described in U.S. Pat. No. 5,114,780, which are end-capped with reactive groups having double and triple bonds. Crosslinking occurs only at the ends, therefore there are no crosslinks between mid-portions of the polymer chains. The limited degree of crosslinking results in a lower than desired glass transition temperature, reduced chemical resistance, as well as mechanical properties that are below desired levels.

International Patent Application Publication WO/91/16370, which is incorporated by reference in its entirety, describes crosslinkable fluorinated aromatic ether compositions. The WO 91/16370 publication is similar to the to the U.S. Pat. No. 5,658,994 discussed above, which is limited in the degree of crosslinking due to the crosslinking agent only being present at the end of the polymer chain. Crosslinking occurs only at the ends, therefore there are no crosslinks between mid-portions of the polymer chains. The limited degree of crosslinking results in a lower than desired glass transition temperature, reduced chemical resistance, as well as mechanical properties that are below desired levels. In addition, the method of the WO 91/16370 publication is sensitive to molecular weight differences, which results in non-uniform crosslinking.

International Patent Application Publication WO/2010/019488, which is incorporated by reference in its entirety, discloses preparation of phenylethynylated monomers for use in preparing polymers which can be thermally crosslinked. The method disclosed in the WO/2010/019488 publication discloses a process that has a limited number of polymers that are suitable, as the polymer disclosed is made only with monomers containing the phenylethynyl groups.

There is a need in the art for polymeric materials with thermal stability at high temperatures, such as temperatures up to 500° C. A method and composition that crosslinks high glass transition polymers to form thermally stable, crosslinked polymer systems, would be desirable in the art.

BRIEF DESCRIPTION OF THE INVENTION

In an exemplary embodiment, the disclosure includes a composition having a crosslinking compound that has the following structure:

wherein R is OH, $NH_2$, halide, ester, amine, ether, or amide, and x is 2-6 and A is an arene moiety having a molecular weight of less than about 10,000.

In another exemplary embodiment, the disclosure includes a mixture that includes a composition and a polymer. The composition includes a crosslinking compound having the following structure:

wherein R is OH, $NH_2$, halide, ester, amine, ether, or amide, and x is 2-6 and A is an arene moiety having a molecular weight of less than about 10,000. The polymer is a polymer containing at least one aromatic group. The mixture is a substantially homogenous blend of the composition and the polymer.

In another exemplary embodiment, the disclosure includes a method for making a polymer blend. The method includes providing a composition including a crosslinking compound having the following structure:

wherein R is OH, $NH_2$, halide, ester, amine, ether, or amide, and x is 2-6 and A is an arene moiety having a molecular weight of less than about 10,000. A polymer is provided wherein the polymer contains at least one aromatic group. The composition and the polymer are combined to form a substantially homogenous mixture.

In another exemplary embodiment, the disclosure includes a crosslinked polymer. The crosslinked polymer is a reaction product of a composition and a polymer. The polymer includes a crosslinking compound having the following structure:

wherein R is OH, $NH_2$, halide, ester, amine, ether, or amide, and x is 2-6 and A is an arene moiety having a molecular weight of less than about 10,000. The polymer is a polymer containing at least one aromatic group.

DETAILED DESCRIPTION OF THE INVENTION

Provided are polymeric materials with thermal stability at high temperatures and a method and composition that crosslinks high glass transition polymers to form thermally stable, crosslinked polymer systems. In particular, the composition of the present disclosure crosslinks high glass transition polymers that were difficult to crosslink or previously believed to be uncrosslinkable. The crosslinked high glass transition temperature polymers according to the present disclosure are thermally stable at temperatures greater than 260° C., greater than 400° C. or up to about or greater than 500° C. The composition according to the present disclosure is useable with unmodified polymers. Polymers with thermal stability up to 500° C. provide opportunities in manufactured articles in terms of utility in scope of application. There are numerous product applications which require a polymer part, which has thermal stability up to 500° C. Certain embodiments of the present disclosure include a high crosslink density. By having a high crosslink density, the glass transition temperature of the polymer formed inherently increases, and the susceptibility to swell decreases, when exposed to solvents. There is an advantage to adding a crosslinking additive to an unmodified polymer to achieve crosslinking, compared to modification of the polymer by grafting a crosslinking moiety to the polymer. For example, unlike in the method according to the present disclosure, modification of the polymer generally requires dissolving the polymer into an appropriate solvent, so that chemical grafting of a crosslinking moiety to the polymer can be performed.

In certain embodiments of the present disclosure, a curing composition includes a multi(9H-fluoren-9-ol-9-yl) arene derivative crosslinking compound that can be used for crosslinking aromatic group containing polymers, such as high glass transition temperature (Tg) polymers. Examples of high glass transition temperature (Tg) polymers include polysulfones, polyimides, polyamides, poly(etherketones), polyureas, polyurethanes, polyphthalamides, polyamide-imides, aramid, poly(benzimidazole). The crosslinks formed are preferably thermally stable to temperatures up to about 500° C. The crosslinking compounds for crosslinking the high Tg polymers includes the following structure:

wherein R is OH, NH$_2$, halide, ester, amine, ether, or amide, and x is 2-6 and A is an arene moiety having a molecular weight of less than about 10,000. A molecular weight of less than about 10,000 permits the overall structure to be more miscible with the polymer, and permits uniformly distribution (with few or no domains) within the blend of polymer and crosslinking agent.

A suitable compound for inclusion in the curing composition includes a crosslinking compound having the following structure:

wherein x is 2-6 and A is an arene moiety having a molecular weight of less than about 10,000. Other suitable structures for crosslinking present in the composition include, but are not limited to, one or more of the following structures:

While not so limited, in order to produce the crosslinking compound according to embodiments of the present disclosure, for example, a halogenated arene can be treated with an alkyllithium in order to exchange the halogen with lithium, then 9-fluorenone is then added. After addition of acid, the crosslinking compound is formed. This exemplary method of forming the crosslinking compound is shown below:

In an embodiment of the present disclosure, a crosslinked high glass transition temperature polymer is formed from a mixture of a composition containing a crosslinking compound and a thermally stable high Tg aromatic polymer. The composition is mixed with the polymer to form a homogenous mixture. The polymer contains at least one aromatic group and may be selected from one or more of a poly(arylene ether) polymer including polymer repeat units of the following structure:

$$(-O-Ar_1-O-Ar_2-)_m(-O-Ar_3-O-Ar_4-)_n$$

where $Ar_1$, $Ar_2$, $Ar_3$, and $Ar_4$ are identical or different aryl radicals, m is 0 to 1, n is 1-m; a polysulfone; a polyimide; a polyamide; a poly(etherketone); a polyurea; a polyurethane; a polyphthalamide; a polyamide-imide; an aramid; and a poly(benzimidazole).

Blending of the crosslinking compounds into the polymer can be performed in various ways. One such way is dissolving both the polymer and crosslinking compound in a common solvent, then removing the solvent via evaporation or addition of a non-solvent to cause co-precipitation of polymer and crosslinking compound. For example, in the case of poly(arylene ether)s as the polymer and Diol-1 (see Examples below) as the crosslinking compound a suitable common solvent to both is tetrahydrofuran, a non-solvent would be water. In some cases a common solvent may not exist or be convenient, in those cases alternate blending procedures are required, such as blending in an extruder, ball mill, or cyro-grinder. The mixing process is preferably accomplished at a temperature during mixing that does not exceed about 250° C., so that premature curing does not occur during the mixing process. In mechanical mixing, the mixture resulting is homogeneous in order to get uniform crosslinking.

The mixture is cured by exposing the mixture to temperatures greater than 250° C., for example, from about 250° C. to about 500° C.

While not wishing to be bound by theory, it is believed at temperatures greater than 250° C., the hydroxyl functionality of the crosslinking compound is dissociated from the remainder of the additive to afford a carbocation which then can undergo a Friedel-Crafts alkyation of the aromatic polymer, resulting in bond formation. The process is repeated with other hydroxyl moieties in the additive to form crosslinks and is shown below:

EXAMPLES

Example 1

Preparation of Diol-1 Crosslinking Compound

Figure 3:
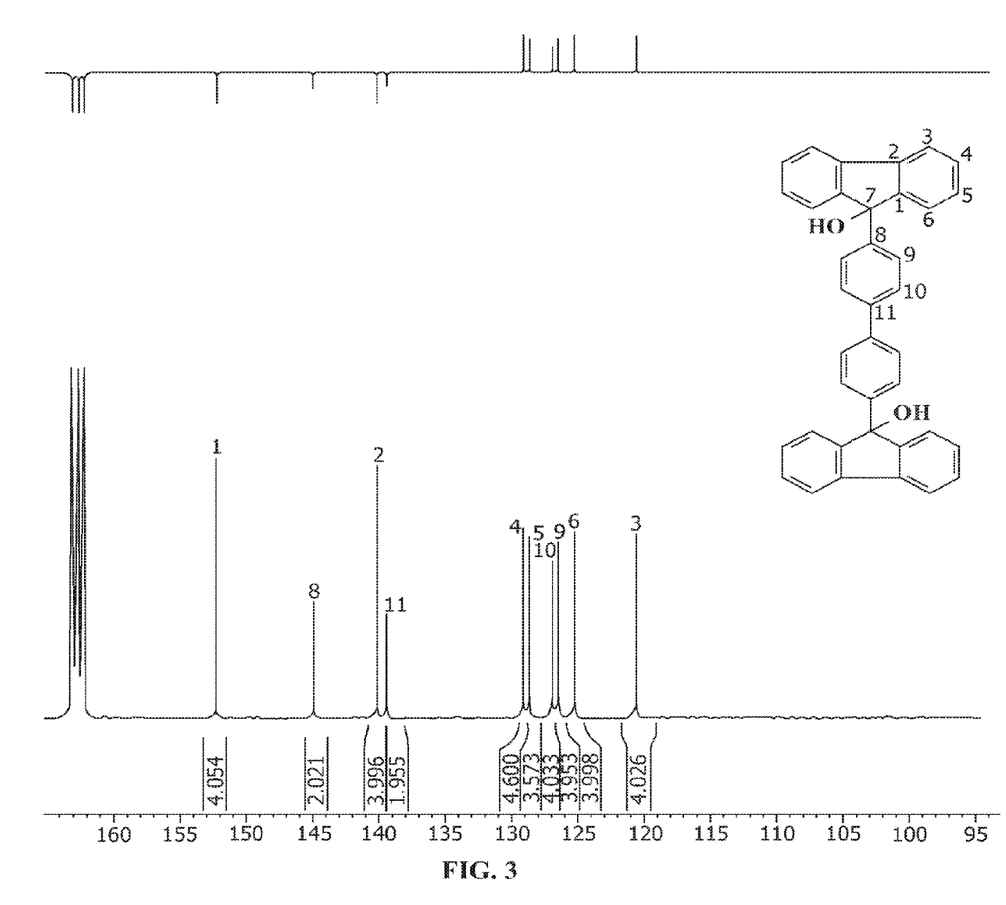
FIG. 3 shows a quantitative $^{13}$C NMR Spectrum of Diol 2 in DMF with Cr(acac)h prepared in Example 2.
Figure 4:
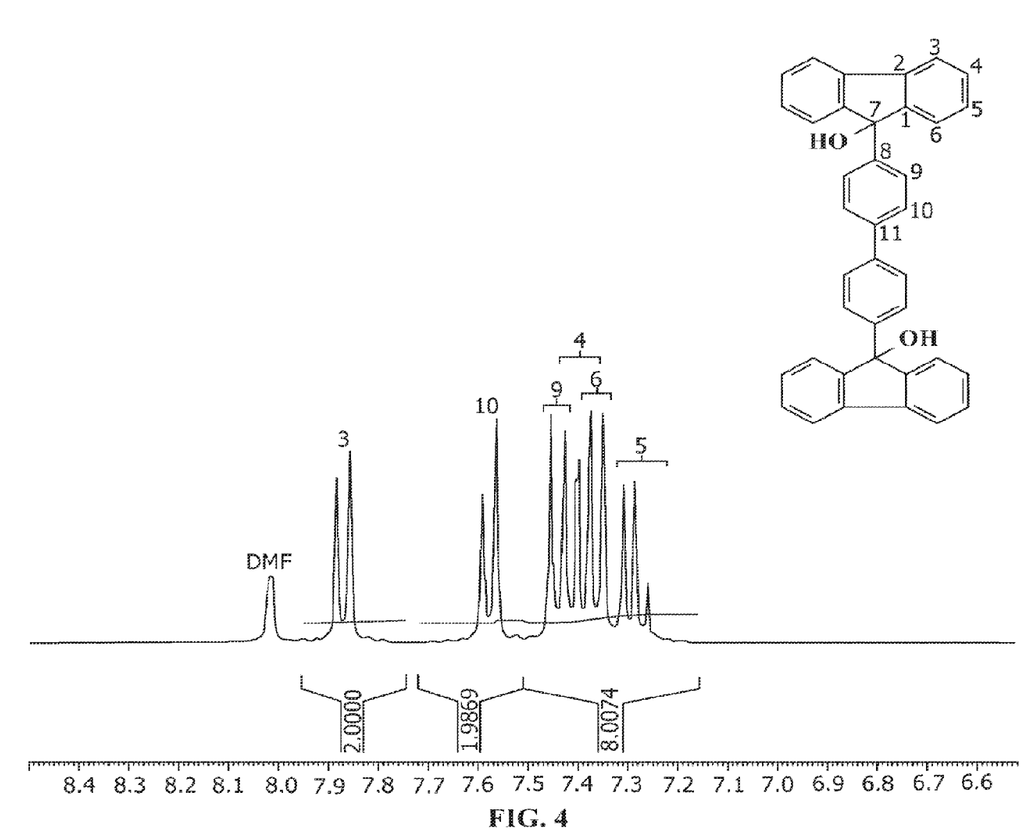
FIG. 4 shows a quantitative $^1$H Spectrum of Diol 2 in THF prepared in Example 2.

A 41.82 g (0.1275 mol.) portion of (4-bromophenyl) ether is dissolved into 750 mL of tetrahydrofuran (THF) and is cooled to −78° C. with a dry ice/acetone bath. The solution is maintained under a static nitrogen blanket. A 300 mL (0.51 mol.) portion of 1.7 M tert-butyllithium in pentane solution is added so that the temperature is maintained at less than −64° C. After addition, the solution is stirred at −78° C. The cooling bath is removed and a 45.95 g (0.255 mol.) portion of 9-fluorenenone is added. The solution is stirred overnight. A 10 mL portion of glacial acetic acid is then added. The gels in the solution are removed via vacuum filtration. The solvent is removed from the solution at 40° C. with the aid of a rotoevaporator. The residual oil is dissolved in 300 mL of acetone, then added to 2800 mL of hexanes. The product precipitate is isolated via filtration. Isolated yield is 64.27 g (95%). The general reaction that results is shown below:

The Diol 2 (the $C_{38}H_{26}O_2$ compound shown above) affords the 13C NMR as shown in FIG. 3. The Diol 2 affords the 1H NMR as shown in FIG. 4.

Example 3

Solution Blends of Diol 1 Crosslinking Compound with High Tg Polymers and Cure

Blends of Diol 1 crosslinking compound and polymers were prepared at the concentrations indicated in Table 1. The general procedure used was the Diol 1 crosslinking compound and polymers were dissolved in the indicated solvent, the solvent was removed as indicated in Table 1.

Figure 1:
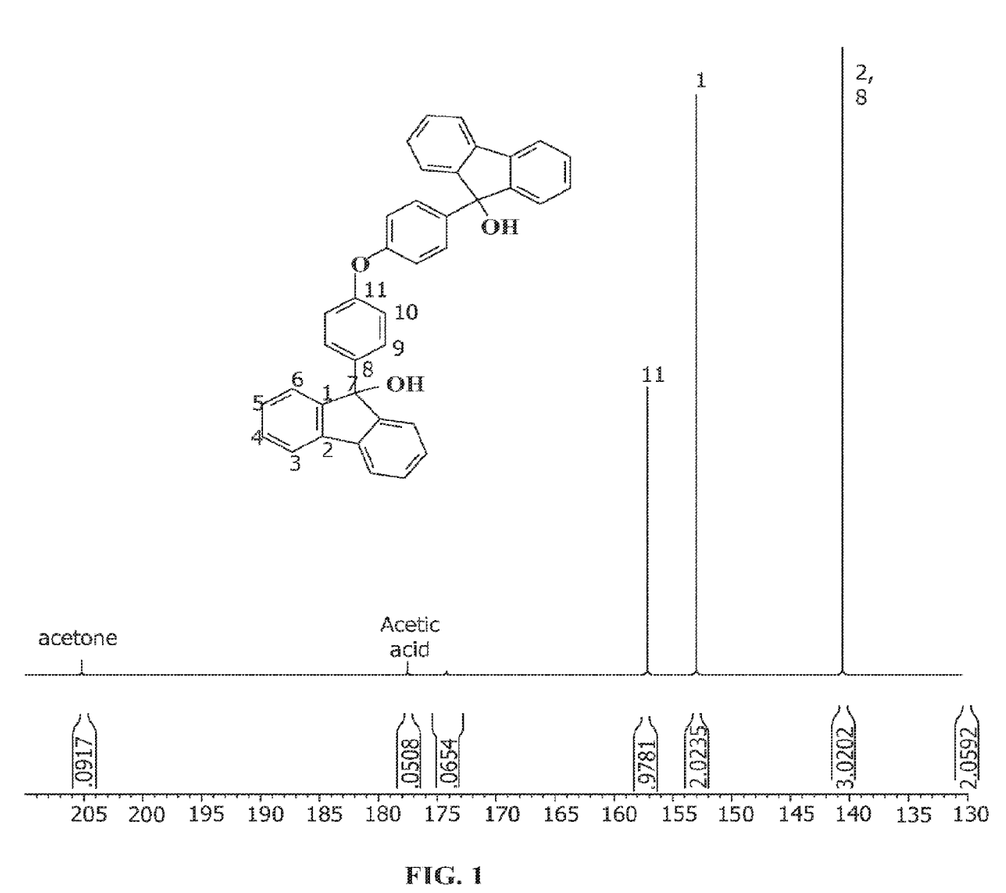
FIG. 1 shows a quantitative $^{13}$C NMR Spectrum of Diol 1 in THF with Cr(acac)a prepared in Example 1.
Figure 2:
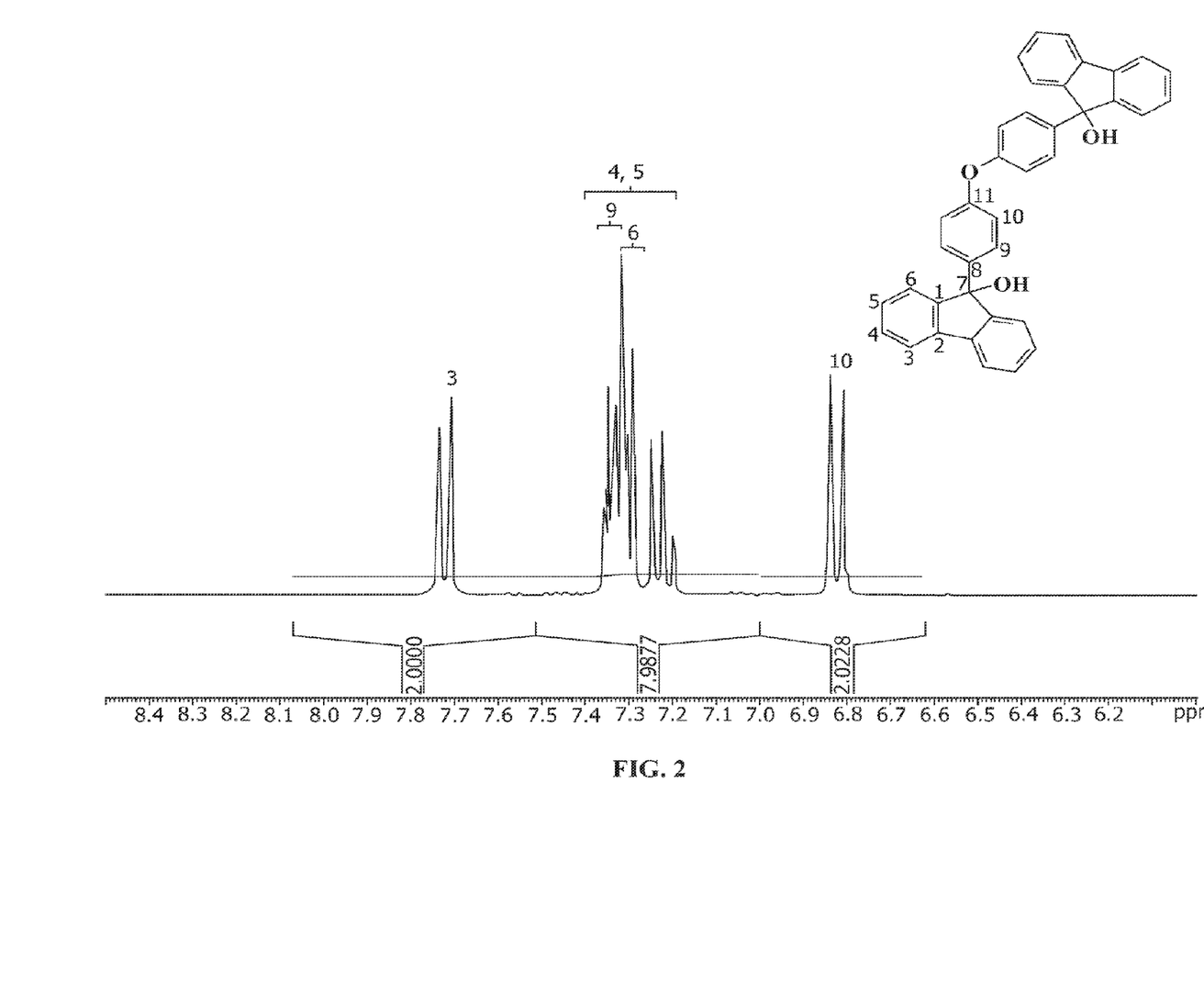
FIG. 2 shows a quantitative $^1$H NMR Spectrum of Diol 1 in THF prepared in Example 1.

The Diol 1 ($C_{38}H_{26}O_3$ compound shown above) formed affords the 13C NMR as shown in FIG. 1. The Diol 1 affords the 1H NMR as shown in FIG. 2.

Example 2

Preparation of Diol 2 Crosslinking Compound

A 26.52 g (0.085 mol) portion of 4,4'-bromobiphenyl is dissolved into 500 mL of tetrahydrofuran (THF) and is cooled to −78° C. with a dry ice/acetone bath. The solution is maintained under a static nitrogen blanket. A 200 mL (0.34 mol) portion of 1.7 M tert-butyllithium in pentane solution is added so that the temperature is maintained at less than −64° C. After addition, the solution is stirred at −78° C. The cooling bath is removed and a 30.63 g (0.17 mol) portion of 9-fluorenenone is added. The solution is stirred overnight. A 10 mL portion of glacial acetic acid is then added. The gels in the solution are removed via vacuum filtration. The solvent is removed from the solution at 40° C. with the aid of a rotoevaporator. The residual oil is dissolved in 200 mL of acetone, then added to 1400 mL of hexanes. Isolated yield after recrystallization in cyclohexanone, the product precipitate is isolated via filtration, affording 43.74 g (95% yield). The general reaction that results is shown below:

TABLE 1

| Blend Number | Polymer | Mass of Polymer | Mass of Diol-1 | Solvent | Mass of Solvent | Procedure for solvent Removal from the Blend |
|---|---|---|---|---|---|---|
| 1A | PAE-2 poly(arylene ether) | 20 g | 0 g | THF | 400 mL | See Below |
| 1B | PAE-2 poly(arylene ether) | 20 g | 7.4 g | THF | 400 mL | See Below |

After complete dissolution, the as-prepared polymer/Diol 1 THF solution was precipitated in deionized water at 1:4 volume ratio using blender. The precipitated particles were collected by vacuum filtration using Whatman 1 filter paper. The collected particles were dried in a vacuum oven at 120° C./17 hours under vacuum.

TABLE 2

| Blend Number | Cure Procedure | Tg (DSC) ° C. | Tg (DMA) ° C. | Crosslink |
|---|---|---|---|---|
| 1A | 1 | 271 | | No |
| 1B | 1 | 281 | | Yes |
| | 2 | 290 | | Yes |
| | 3 | 277 | 290 | Yes |

Cure procedure 1: as-prepared blend in DSC cell under $N_2$ environment at cure cycle: Heat/Cool/Heat at 20/10/20° C. rate from RT-400° C., glass transition Tg was determined in the 2nd heat. Cure procedure 2: Cold-pressed pellet from the as-prepared blend in the parallel plate of AR-2000 rheometer under $N_2$ purge, heat cycle: 320-400° C. at a 5° C./min ramp, and hold 30 minutes at 400° C., sample was taken out immediately for DSC analysis using the same protocol aforementioned. Cure procedure 3: as-prepared blend was compression molded under the following condition: An 8 g portion of polymer/crosslinker blend was put into a mold 13.97 cm (5.5 inches) long by 1.27 cm (0.5 inches) wide, and is compressed to 0.3 tons pressure. The molding starts at ambient temperature and is taken to 398.88° C. (750° F.) the pressure is increased to 0.5 tons @ 650° F. and held until temp reaches 750° F. then cooled down under 0.7 tons pressure in a cold press until mold reaches 550° F. The final compressed thickness is approx. 0.317 cm (0.125 inches). Glass transition of as-molded bar was determined by DMA test using AR-2000 (determined by tan δ, RT-350° C. at 5° C./min ramp under $N_2$ environment) and by OSC using the same protocol aforementioned.

Example 4

Mechanical Bending of Diol 1 Crosslinking Compound with High Tg Polymers and Cure Blends of Diol 1 crosslinking compound and polymers were prepared at the concentrations indicated in Table 3. The general procedure used for blending was the Diol 1 crosslinking compound and polymers were combined in a cryoblender (6870 Freezer/mill from Spex) using following grinding protocol: Cycle: 3, Precool: 10 minutes, Run time: 3 minutes, Cool time: 2 minutes, Rate: 12 CPS. Properties of cured blends are summarized in Table 4.

TABLE 3

| Blend Number | Polymer | Mass of Polymer | Mass of Diol-1 |
|---|---|---|---|
| 2A | PAE-2 poly(arylene ether) | 11.0 g | none |
| 2B | PAE-2 poly(arylene ether) | 8.0 g | 2.96 g |
| 3A | PAE-2 poly(arylene ether) | 11.0 g | none |
| 3B | PAE-2 poly(arylene ether) | 8.0 g | 2.96 g |
| 4A | PEEK450 | 11.0 g | none |
| 4B | PEEK450 | 8.0 g | 2.96 g |
| 5A | Radel R-5500NT | 11.0 g | none |
| 5B | Radel R-5500NT | 8.0 g | 2.96 g |

TABLE 4

| Blend Number | Cure Procedure | Tg (DSC) ° C. | Tg (DMA) ° C. | Crosslink |
|---|---|---|---|---|
| 2A | 1 | 271 | | No |
| 2B | 1 | 280 | | Yes |
| | 2 | 285 | | Yes |
| | 3 | 278 | 293 | Yes |
| 3A | 1 | 279 | | No |
| | 2 | 280 | | No |
| | 3 | 278 | 286 | No |
| 3B | 1 | 287 | | Yes |
| | 2 | 289 | | Yes |
| | 3 | 285 | 295 | Yes |
| 4A | 1 | 152 | | No |
| | 2 | 153 | | No |
| | 3 | 151 | 166 | No |
| 4B | 1 | 161 | | Yes |
| | 2 | 167 | | Yes |
| | 3 | 161 | 172 | Yes |
| 5A | 1 | 225 | | No |
| | 2 | 226 | | No |
| | 3 | 223 | 225 | No |
| 5B | 1 | 231 | | Yes |
| | 2 | 238 | | Yes |
| | 3 | 220 | 226 | Yes |

Cure procedure 1: as-prepared blend in DSC cell under $N_2$ environment at cure cycle: Heat/Cool/Heat at 20/10/20° C. rate from RT-400° C., glass transition Tg was determined in the 2nd heat. Cure procedure 2: Cold-pressed pellet from the as-prepared blend in the parallel plate of AR-2000 rheometer under $N_2$ purge, heat cycle: 320-400° C. at a 5° C./min ramp, and hold 30 minutes at 400° C., sample was taken out immediately for DSC analysis using the same protocol aforementioned. Cure procedure 3: as-prepared blend was compression molded under the following condition: An 8 g portion of polymer/crosslinker blend was put into a mold 13.97 cm (5.5 inches) long by 1.27 cm (0.5 inches) wide, and is compressed to 0.3 tons pressure. The molding starts at ambient temperature and is taken to 398.88° C. (750° F.) the pressure is increased to 0.5 tons @ 650° F. and held until temp reaches 750° F. then cooled down under 0.7 tons pressure in a cold press until mold reaches 550° F. The final compressed thickness is approx. 0.317 cm (0.125 inches). Glass transition of as-molded bar was determined by DMA test using AR-2000 (determined by tan δ, RT-350° C. at 5° C./min ramp under $N_2$ environment) and by OSC using the same protocol aforementioned.

Example 5

Mechanical Blending Diol 2 Crosslinking Compound with High Tg Polymers and Cure

Blends of Diol 2 crosslinking compound and polymers were prepared at the concentrations indicated in Table 5. The general procedure used for blending was the Diol 2 crosslinking compound and polymers were combined in a cryoblender (6870 Freezer/mill from Spex) using the following grinding protocol: Cycle: 3, Precool: 10 minutes, Run time: 3 minutes, Cool time: 2 minutes, Rate: 12CPS. Properties of cured blends are summarized in Table 6.

TABLE 5

| Blend Number | Polymer | Mass of Polymer | Mass of Diol-2 |
|---|---|---|---|
| 6A | PAE-2 poly(arylene ether) | 11.00 g | none |
| 6B | PAE-2 poly(arylene ether) | 8.00 g | 2.96 g |
| 7A | PEEK450 | 11.00 g | none |
| 7B | PEEK450 | 8.00 g | 2.96 g |

TABLE 6

| Blend Number | Cure Procedure | Tg (DSC) ° C. | Tg (DMA) ° C. | Crosslink |
|---|---|---|---|---|
| 6A | 1 | 279 | | No |
|    | 2 | 280 | | No |
|    | 3 | 278 | 286 | No |
| 6B | 1 | 292 | | Yes |
|    | 2 | 292 | | Yes |
|    | 3 | 282 | 299 | Yes |
| 7A | 1 | 152 | | No |
|    | 2 | 153 | | No |
|    | 3 | 151 | 166 | No |
| 7B | 1 | 155 | | Yes |
|    | 2 | 159 | | Yes |
|    | 3 | 156 | 172 | Yes |

Cure procedure 1: as-prepared blend in DSC cell under N₂ environment at cure cycle: Heat/Cool/Heat at 20/10/20° C. rate from RT-400° C., glass transition Tg was determined in the 2nd heat. Cure procedure 2: Cold-pressed pellet from the as-prepared blend in the parallel plate of AR-2000 rheometer under N₂ purge, heat cycle: 320-400° C. at a 5° C./min ramp, and hold 30 minutes at 400° C., sample was taken out immediately for DSC analysis using the same protocol aforementioned. Cure procedure 3: as-prepared blend was compression molded under the following condition: An 8 g portion of polymer/crosslinker blend was put into a mold 13.97 cm (5.5 inches) long by 1.27 cm (0.5 inches) wide, and is compressed to 0.3 tons pressure. The molding starts at ambient temperature and is taken to 398.88° C. (750° F.) the pressure is increased to 0.5 tons @ 650° F. and held until temp reaches 750° F. then cooled down under 0.7 tons pressure in a cold press until mold reaches 550° F. The final compressed thickness is approx. 0.317 cm (0.125 inches). Glass transition of as-molded bar was determined by DMA test using AR-2000 (determined by tan δ, RT-350° C. at 5° C./min ramp under N₂ environment) and by OSC using the same protocol aforementioned.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition comprising a crosslinking compound having the following structure:

2. A mixture comprising:
a composition including a crosslinking compound having the following structure:

wherein R is OH, NH₂, halide, ester, amine, ether, or amide, and x is 2-6 and A is an arene moiety having a molecular weight of less than about 10,000; and
a polymer containing at least one aromatic group;
wherein the mixture is a substantially homogenous blend of the composition and the polymer.

3. The mixture of claim 2, wherein the polymer is selected from the group consisting of a poly(arylene ether) polymer including polymer repeat units of the following structure:

where $Ar_1$, $Ar_2$, $Ar_3$, and $Ar_4$ are identical or different aryl radicals, m is 0 to 1, n is 1-m; a polysulfone; a polyimide; a polyamide; a poly(etherketone); a polyurea; a polyurethane; a polyphthalamide; a polyamide-imide; an aramid; a poly(benzimidazole); and combinations thereof.

4. The mixture of claim 2, wherein the mixture is a co-precipitated blend of the composition and the polymer.

5. The mixture of claim 2, wherein the mixture is a co-evaporated blend of the composition and the polymer.

6. The mixture of claim 2, wherein the mixture is a mechanically mixed blend of the composition and the polymer.

7. The mixture of claim 2, wherein the crosslinking compound has a structure selected from a group consisting of:

; and

8. The mixture of claim 2, wherein the crosslinking compound has the following structure:

9. The mixture of claim 2, wherein the crosslinking compound has the following structure:

10. The mixture of claim 2, wherein the crosslinking compound has the following structure:

11. The mixture of claim 2, wherein the crosslinking compound has the following structure:

12. A method for making a polymer blend comprising:
providing a composition including a crosslinking compound having the following structure:

wherein R is OH, NH$_2$, halide, ester, amine, ether, or amide, and x is 2-6 and A is an arene moiety having a molecular weight of less than about 10,000; and
providing a polymer containing at least one aromatic group;
combining the composition and the polymer to form a substantially homogeneous mixture.

13. The method of claim 12, wherein the polymer is selected from the group consisting of a poly(arylene ether) polymer including polymer repeat units of the following structure:

where Ar$_1$, Ar$_2$, Ar$_3$, and Ar$_4$ are identical or different aryl radicals, m is 0 to 1, n is 1-m; a polysulfone; a polyimide; a polyamide; a poly(etherketone); a polyurea; a polyurethane; a polyphthalamide; a polyamide-imide; an aramid; a poly(benzimidazole); and combinations thereof.

14. The method of claim 12, wherein the combining includes dissolving the composition and the polymer in a solvent to form a solution, adding the solution to a non-solvent, and co-precipitating the composition and the polymer to form the substantially homogenous mixture.

15. The method of claim 12, wherein the combining includes dissolving the composition and the polymer in a solvent to form a solution, evaporating the solvent from the solution to form the substantially homogenous mixture.

16. The method of claim 12, wherein the combining includes dissolving the composition and the polymer in a solvent to form a solution, evaporating the solvent from the solution to form the substantially homogenous mixture.

17. The method of claim 12, wherein the combining includes mechanically blending the composition and the polymer to form the substantially homogenous mixture.

18. The method of claim 17, wherein the mechanical blending is in an extruder, ball mill, or cyrogrinder.

19. The method of claim 12, wherein the crosslinking compound has a structure selected from a group consisting of:

-continued

; and

20. The method of claim 12, wherein the crosslinking compound has the following structure:

21. The method of claim 12, wherein the crosslinking compound has the following structure:

22. The method of claim 12, wherein the crosslinking compound has the following structure:

23. The method of claim 12, wherein the crosslinking compound has the following structure:

24. A crosslinked polymer comprising:
a reaction product of a composition including a crosslinking compound having the following structure:

wherein R is OH, NH$_2$, halide, ester, amine, ether, or amide, and x is 2-6 and A is an arene moiety having a molecular weight of less than about 10,000; and
a polymer containing at least one aromatic group.

25. The crosslinked polymer of claim 24, wherein the polymer is selected from the group consisting of a poly(arylene ether) polymer including polymer repeat units of the following structure:

$(-O-Ar_1-O-Ar_2-)_m(-O-Ar_3-O-Ar_4-)_n$ where Ar$_1$, Ar$_2$, Ar$_3$, and Ar$_4$ are identical or different aryl radicals, m is 0 to 1, n is 1-m; a polysulfone; a polyimide; a polyamide; a poly(etherketone); a polyurea; a polyurethane; a polyphthalamide; a polyamide-imide; an aramid; a poly(benzimidazole); and combinations thereof.

26. The crosslinked polymer of claim 24, wherein the reaction product is thermally cured.

27. The crosslinked polymer of claim 26, wherein the reaction product is thermally cured by heating to temperatures greater than about 250° C.

28. The crosslinked polymer of claim 24, wherein the reaction product is radiation cured.

29. The crosslinked polymer of claim 28, wherein the reaction product is radiation cured by exposure to radiation selected from the group consisting of microwave, infrared, ultraviolet, and electron beam.

30. The crosslinked polymer of claim 24, wherein the reaction product is thermally stable at temperature greater than 260° C.

31. The crosslinked polymer of claim 24, wherein the reaction product is thermally stable at temperature greater than 400° C.

* * * * *